United States Patent
Wu et al.

(10) Patent No.: US 6,618,509 B2
(45) Date of Patent: *Sep. 9, 2003

(54) DIGITAL IMAGE CODING SYSTEM HAVING SELF-ADJUSTING SELECTION CRITERIA FOR SELECTING A TRANSFORM FUNCTION

(75) Inventors: Hsi-Jung Wu, Mountain View, CA (US); Yu Tina Tian, Stanford, CA (US); Jian Lu, Santa Clara, CA (US); Ke-Chiang Chu, Saratoga, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/829,519

(22) Filed: Apr. 9, 2001

(65) Prior Publication Data

US 2001/0033139 A1 Oct. 25, 2001

Related U.S. Application Data

(63) Continuation of application No. 09/396,084, filed on Sep. 14, 1999, now Pat. No. 6,229,917, which is a continuation of application No. 08/678,427, filed on Jul. 3, 1996, now Pat. No. 6,011,864.

(51) Int. Cl.[7] ............................................... G06K 9/00
(52) U.S. Cl. .................. 382/239; 382/172; 358/426.14; 348/409.1
(58) Field of Search ............................... 382/168, 172, 382/232, 239, 248; 358/426.14, 466, 426.02, 426.16; 348/384.1, 394.1, 395.1, 397.1, 402.1, 403.1, 404.1, 413.1, 416.1, 420.1, 431.1

(56) References Cited

U.S. PATENT DOCUMENTS

| | | | | |
|---|---|---|---|---|
| 5,327,502 A | * | 7/1994 | Katata et al. | 382/239 |
| 5,559,900 A | * | 9/1996 | Jayant et al. | 382/248 |
| 5,719,961 A | * | 2/1998 | Normile et al. | 382/239 |
| 5,883,979 A | * | 3/1999 | Beretta et al. | 382/251 |
| 6,229,917 B1 | * | 5/2001 | Wu et al. | 382/172 |

OTHER PUBLICATIONS

Performance of a real–time software–only H.261 codec on the Power Macintosh, H. Wu et al., SPIE vol. 2419 pp. 492–498.

* cited by examiner

*Primary Examiner*—Samir Ahmed
(74) *Attorney, Agent, or Firm*—Blakely, Sokoloff, Taylor & Zafman LLP

(57) ABSTRACT

In a digital signal processing system, a method for selecting a transform function to apply to an input signal based on characteristics of the signal, and for self-adjusting criteria which are used in selecting a transform function to apply to a subsequent signal. Characteristics are obtained from the signal. The characteristics are compared to adjustable criteria which are used in selecting a transform function. Differing criteria are maintained for the different selectable transform functions. A record is maintained of transform functions selected and the particular characteristics that caused the selection. Based on the ability of a transform function to minimally define the coded signal, an inverse transform function is selected to decode the signal. The criteria used in selecting a transform function to apply to a subsequent signal are adjusted based on a quality measure of the decoded signal and the record of selected transform functions.

22 Claims, 7 Drawing Sheets

FIG. 5

Total Energy Threshold Array 452

Quantizer step values, Q

Transform Functions

FIG. 6

|   | 1 | 2 | 3 | 4 | 5 | 6 | 7 | 8 |
|---|---|---|---|---|---|---|---|---|
| 1 | $c_{1,1}$ | $c_{1,2}$ | $c_{1,3}$ | $c_{1,4}$ | $\emptyset$ | $\emptyset$ | $\emptyset$ | $\emptyset$ |
| 2 | $c_{2,1}$ | $c_{2,2}$ | $c_{2,3}$ | $c_{2,4}$ | $\emptyset$ | $\emptyset$ | $\emptyset$ | $\emptyset$ |
| 3 | $c_{3,1}$ | $c_{3,2}$ | $c_{3,3}$ | $c_{3,4}$ | $\emptyset$ | $\emptyset$ | $\emptyset$ | $\emptyset$ |
| 4 | $c_{4,1}$ | $c_{4,2}$ | $c_{4,3}$ | $c_{4,4}$ | $\emptyset$ | $\emptyset$ | $\emptyset$ | $\emptyset$ |
| 5 | $\emptyset$ | $\emptyset$ | $\emptyset$ | $\emptyset$ | $\emptyset$ | $\emptyset$ | $\emptyset$ | $\emptyset$ |
| 6 | $\emptyset$ | $\emptyset$ | $\emptyset$ | $\emptyset$ | $\emptyset$ | $\emptyset$ | $\emptyset$ | $\emptyset$ |
| 7 | $\emptyset$ | $\emptyset$ | $\emptyset$ | $\emptyset$ | $\emptyset$ | $\emptyset$ | $\emptyset$ | $\emptyset$ |
| 8 | $\emptyset$ | $\emptyset$ | $\emptyset$ | $\emptyset$ | $\emptyset$ | $\emptyset$ | $\emptyset$ | $\emptyset$ |

DIGITAL IMAGE CODING SYSTEM HAVING SELF-ADJUSTING SELECTION CRITERIA FOR SELECTING A TRANSFORM FUNCTION

This is a continuation of U.S. patent application Ser. No. 09/396,084, filed on Sep. 14, 1999, now U.S. Pat. No. 6,229,917, which is in turn a continuation of U.S. patent application Ser. No. 08/678,427, filed on Jul. 3, 1996, now U.S. Pat. No. 6,011,864.

BACKGROUND OF THE INVENTION

1. Field of the Invention

The present invention generally relates to coding digital video images, and more particularly to reducing loss of image information by automatically adjusting operating parameters utilized in the coding process.

2. Description of Background Art

Digital video systems are becoming increasingly popular, especially in business settings. An example application of a digital video system is a teleconferencing system. Despite their popularity, digital video systems can be extremely expensive in terms of storage and communication costs. The cost of storage and communication is driven by the massive quantity of digital image data which is generated by the system.

One way to reduce costs or improve performance is to reduce the quantity of digital data used to represent images. Various well known compression techniques have been utilized to reduce the quantity of data used to represent a digitized image. While image compression may reduce some of the costs associated with handling digital image data, the downside is that image quality may suffer.

A number of compression techniques conventionally involve linear transformation of the digital image, followed by quantization, and coding of transform coefficients. In this way, the quantized and coded signals may be compressed, transmitted, or stored, and subsequently decompressed using an inverse set of operations.

The Discrete Cosine Transform (DCT) has commonly been used for image compression and decompression. However, because such DCT-based image processing is computationally intensive, various methods have been devised to improve the performance of the transform process.

The DCT process involves computing a set of coefficients to represent the digital image. One approach used to reduce the time required to perform the transform process is to compute only a subset of the coefficients. The selection of the particular subset of coefficients to be computed is based on detected characteristics of the digital image. While yielding acceptable results, the prior art process of classifying a digital image according to its characteristics and then selecting a subset of coefficients has no mechanism to measure the quality of the transformed image. Furthermore, the selection criteria used to classify an image are fixed such that they cannot be easily adjusted to improve image quality.

Therefore, to improve the quality of compressed digital images what is needed is a coding system having self-adjusting selection criteria for selecting a transform function.

SUMMARY OF THE INVENTION

The invention monitors the quality of coded digital images, and based on the monitored quality of the images, updates operating parameters that are used in coding the images.

A set of predetermined coding functions is available in a video coding system to code a digitized video image. One of the coding functions is selected and applied to the input image. The selection of the coding function is made based upon measured characteristics of the input image and selection criteria which are applied to the measured characteristics. The image is then decoded and the quality of the decoded image is measured. The selection criteria are updated based on the measured quality of the decoded image, whereby for subsequent images coding functions are selected to produce images with a higher quality measure.

In another aspect of the invention, an historical record is made for the measured characteristics of the images processed by the system. The measured characteristics are correlated with the selected coding function. Periodically, the selection criteria are updated based on the historical record. The historical record provides a broad perspective upon which updating of the selection criteria is based.

The invention further selects one of a predetermined set of transform functions to code an image. An inverse transform function is selected, independent of the selection of the first transform function, whose application minimally covers the coefficients produced by application of the first transform function. The inverse transform function is then applied to the coefficients, the quality is measured, and the selection criteria are updated as described above. The updating of the selection criteria enables selection of a suitable transform function.

In still another aspect of the invention, the selection criteria include adjustable thresholds and comparisons of them to measured characteristics of the image to be coded. The measured characteristics are correlated to the selected inverse transform function in the historical record. The respective thresholds are then updated from the historical record of the measured characteristics.

BRIEF DESCRIPTION OF THE DRAWINGS

FIG. 5 shows the Total Energy Threshold Array memory map;

FIG. 6 shows the memory map of a block which is output after the application of the Four-by-Four block transform function;

DETAILED DESCRIPTION

Figure 1:
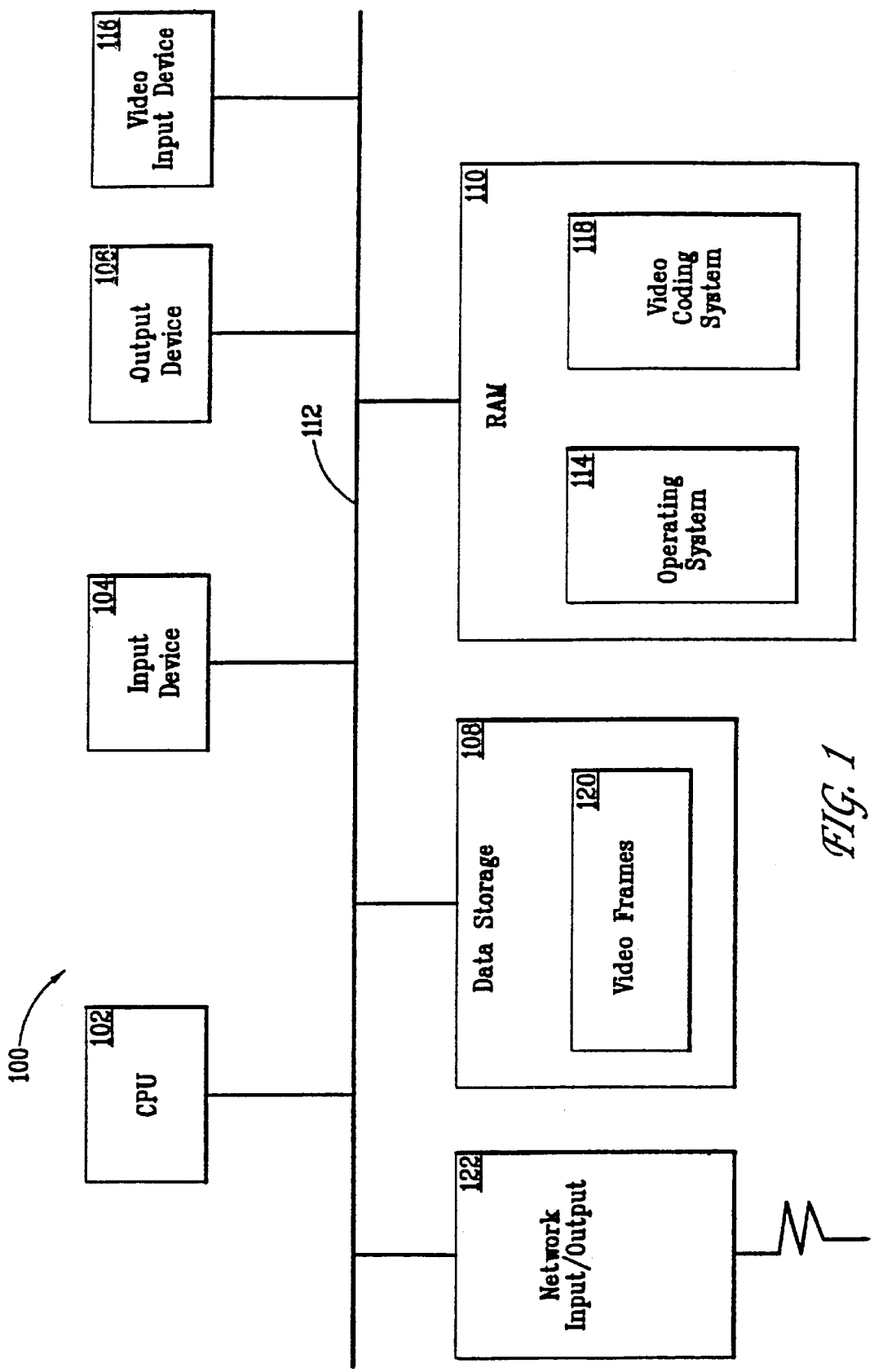
FIG. 1 is a block diagram of a computer system for encoding video sequences.

FIG. 1 is a block diagram of a computer system 100 for encoding video sequences. The exemplary system 100 is a Power Macintosh which is available from Apple Computer, Inc. The system includes a central processing unit (CPU) 102, an input device 104 such as a keyboard or a mouse, and an output device 106 such as a computer monitor. The system 100 further includes data storage 108 which may consist of magnetic disks and/or tapes, optical storage, or various electronic storage media. The RAM 110 is available for storage of program instructions and data as referenced by the CPU 102. The functional units of the system 100 are interconnected by a signal bus 112.

An operating system program 114 is shown as stored in the RAM 110 to indicate that the program is executable by the CPU 102, even though only portions of the program may be present in the RAM at a given time. The operating system 114 controls allocation of the resources which are available in the system 100.

The system 100 further includes a video input device 116 which is coupled to the bus 112. The video input device 116 captures and digitizes frames of images presented to a camera portion of the video input device 116. The video coding system program 118, represented as being stored in the RAM 110, compresses the frames of data input by the video input device 116. The compressed frames may then, depending upon the application, be either stored on the data storage 108 as video frames 120, or output to a receiving application via the network input/output device 122.

Figure 2:
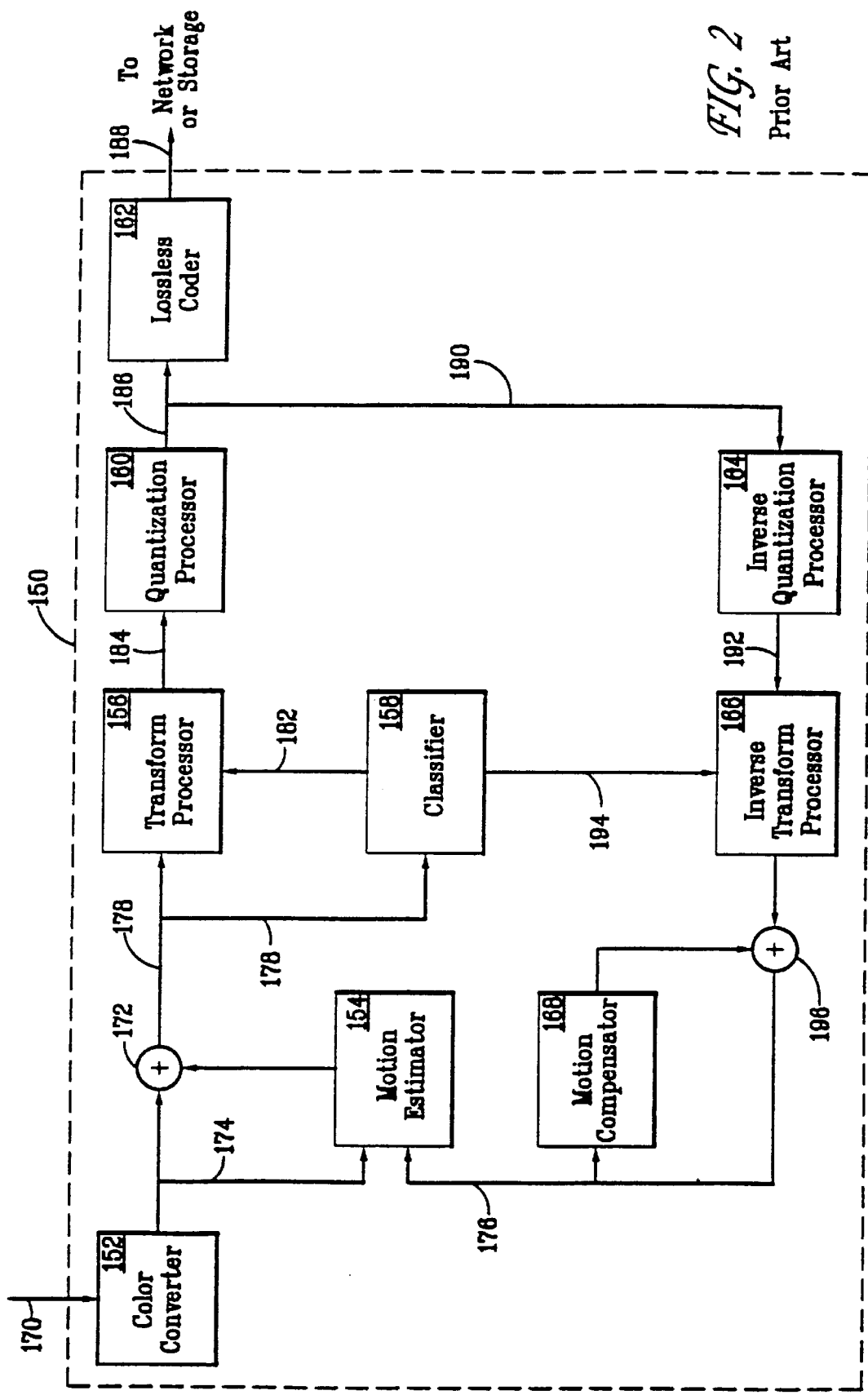
FIG. 2 is a block diagram of a prior art video coding system.

FIG. 2 is a block diagram of a prior art video coding system 150. The video coding system 150 has program modules comprising a color converter 152, a motion estimator 154, a transform processor 156, a classifier 158, a quantization processor 160, a lossless coder 162, an inverse quantization processor 164, an inverse transform processor 166, and a motion compensator 168, the latter three of which provide feedback data to the motion Estimator 154.

The color converter 152 receives a frame of a digitized video image via input line 170 and converts the frame from Red-Green-Blue (RGB) format to a luminance-chrominance format such as Yuv. The converted frame is provided as input to a summation element 172. The second input to the summation element 172 is provided by the motion estimator 154.

The motion estimator 154 receives as input a frame from color converter 152 as shown by line 174. The previously processed frame is also input to the motion estimator 154 as shown by line 176. The motion estimator 154 compares the frames to estimate the movement of portions of the image in the frame. The output of the motion estimator 154 is provided to the summation element 172 which outputs a residual frame on line 178 to the transform processor 156. The residual frame is essentially the difference between the present frame as input on line 174 and the previous frame as input on line 176.

The transform processor 156 receives the residual frame from the summation element 172. The input frame is processed one block at a time, where a block is an m×n array of elements of the input frame. Each element of the block represents a pixel of data. In the exemplary embodiment the block size is an 8×8 array of pixel data. The input frame is also input to the classifier 158 via line 178.

The transform processor 156 applies a Discrete Cosine Transform function to the input block to obtain an output block of coefficients. Background material on transform coding of images may be found in *Transform Coding of Images*, R. J. Clarke, Academic Press (London), 1985. To save computation time, the transform processor 156, based on a selection made by the classifier 158, may compute only a subset of the coefficients of the block. The classifier 158 determines characteristics of the input block, and based on predetermined selection criteria, selects for computation a subset of the coefficients of the block. Note, however, that a block having certain characteristics will result in the computation of all coefficients of a block. The selected subset of coefficients to compute is input to the transform processor 156 as shown by line 182. The selected subset of coefficients which is selected for computation is hereinafter referred to as the "transform function" or "transform type."

Each block of coefficients output by the transform processor 156 is input on line 184 to the quantization processor 160. The quantization processor 160 reduces the number of bits required to represent each of the coefficients in the block by dividing each coefficient by a predetermined constant. The predetermined constant is selected based on the application's required bit transmission rate.

The block of quantized coefficients is input on line 186 to the lossless coder 162. The lossless coder 162 codes the block and outputs the coded information on line 188 for storage to data storage 108, output on network input/output 122, or output to output device 106.

The block of quantized coefficients is also provided as feedback on line 190 to the inverse quantization processor 164, to the inverse transform processor 166, and to the motion compensator 168. The purpose of the feedback data is to permit the motion estimator 154 to perform its estimation by comparing a newly input frame to a frame of the previous image as viewed by an application receiving the output of lossless coder 162.

The inverse quantizer 164 multiplies each coefficient of the input quantized block by the same predetermined constant that was used by the quantization processor 160. The output of the inverse quantizer 164 is provided via line 192 as input to the inverse transform processor 166.

The inverse transform processor 166 performs the inverse of the transform function performed by the transform processor 156 and as indicated by the classifier 158 on line 194. The motion compensator 168 obtains the block of pixels from the previously decoded image which is offset by the motion vectors from the block of interest. The summation element 196 performs a pixel-wise addition of the negated output of the motion compensator 168 with the incoming block.

Figure 3:
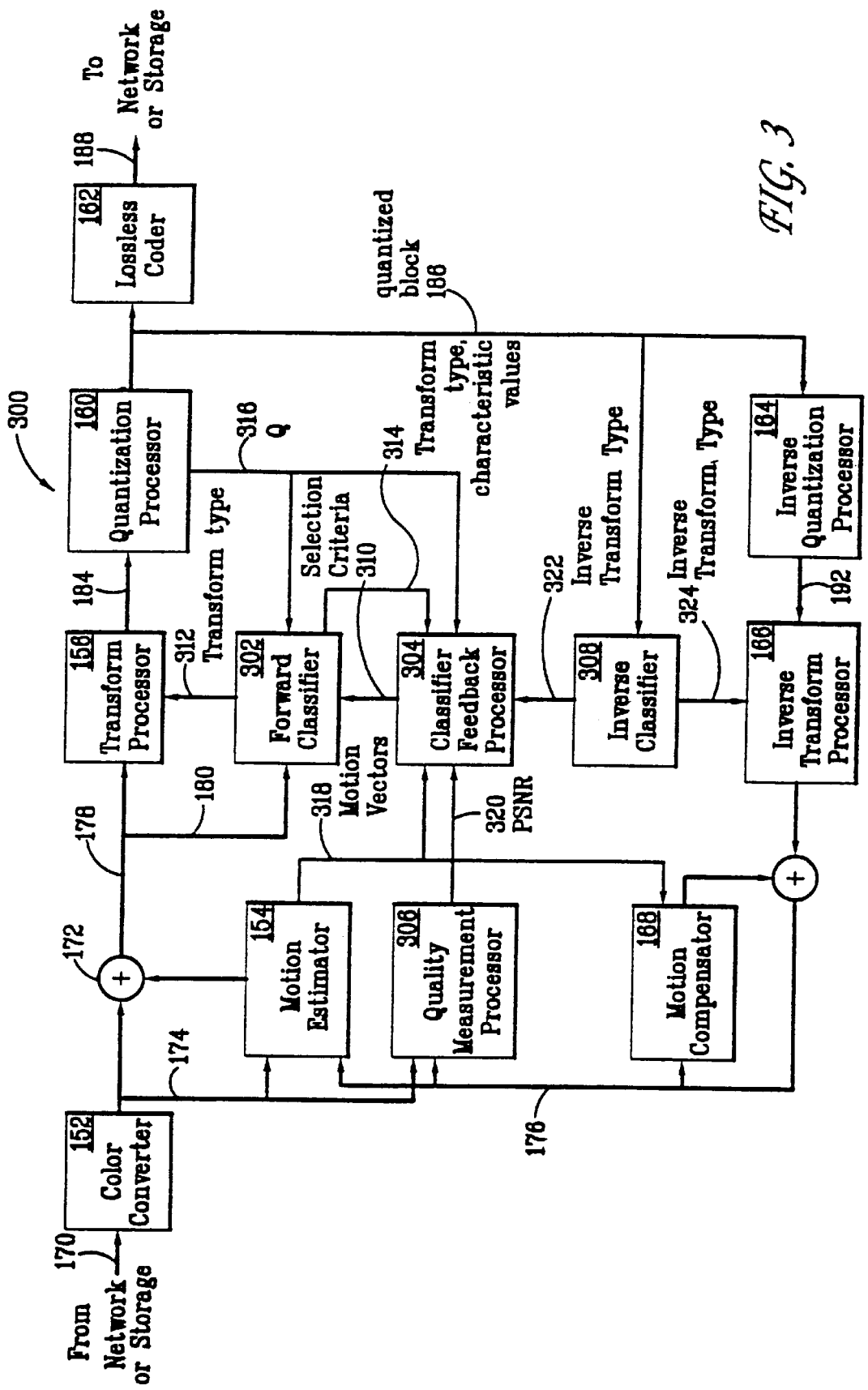
FIG. 3 is a block diagram of a video coding system which utilizes the present invention.

FIG. 3 is a block diagram of a video coding system 300 which utilizes the present invention. The elements added to FIG. 2 in FIG. 3 include a forward classifier 302, a classifier feedback processor 304, a quality measurement processor 306, and an inverse classifier 308.

The forward classifier 302 selects a transform type, which is indicative of a selectable transform function, based on the characteristics of the block input on line 180 and adjustable selection criteria as provided by the classifier feedback processor 304 on line 310. Recall from FIG. 2 that the selectable transform function is an indication of the subset of coefficients to compute for the input block. The transform type is input on line 312 to the transform processor 156.

The classifier feedback processor 304 provides selection criteria on line 310 to the forward classifier 302. The selection criteria are adjusted by the classifier feedback processor 304 based on various input data, including: (1) from the forward classifier 302, the transform type and characteristic values computed for a block as shown by line 314; (2) from the quantization processor 160, the quantization value, Q, on line 316; (3) from the motion estimator 154, motion vectors on line 318; (4) from the quality measurement processor 306, a Peak Signal to Noise Ratio (PSNR) on line 320; and (5) from the inverse classifier, an inverse transform type on line 322. The processing performed by the classifier feedback processor is explained further in the discussion pertaining to the FIGs. that follow.

Generally, the quality measurement processor 306 measures the quality of the coded images produced by the video coding system 118 for the purpose of improving the quality of subsequent images coded by the system 118. The quality measurement processor 306 does so by indicating to the classifier feedback processor 304 the PSNR of a block which has been coded and then decoded, relative to the block input for coding. The processing performed by the quality measurement processor 306 is explained further in the discussion pertaining to the FIGs. that follow.

The inverse classifier 308 selects an inverse transform function for input on line 322 to the classifier feedback processor 304 and for input on line 324 to the inverse transform processor 166. The inverse classifier 308 selects an inverse transform type independent of the classification performed by the forward classifier 302. The purpose of the independent selection is decode the block so that the selection criteria used by the forward classifier 302 may be adjusted to improve the speed of the transform processor 156 while maintaining the fidelity of the coefficients which are output by the transform processor. The processing performed by the inverse classifier 308 is explained further in the discussion pertaining to the FIGs. that follow.

Figures 4, 4A, 4B:
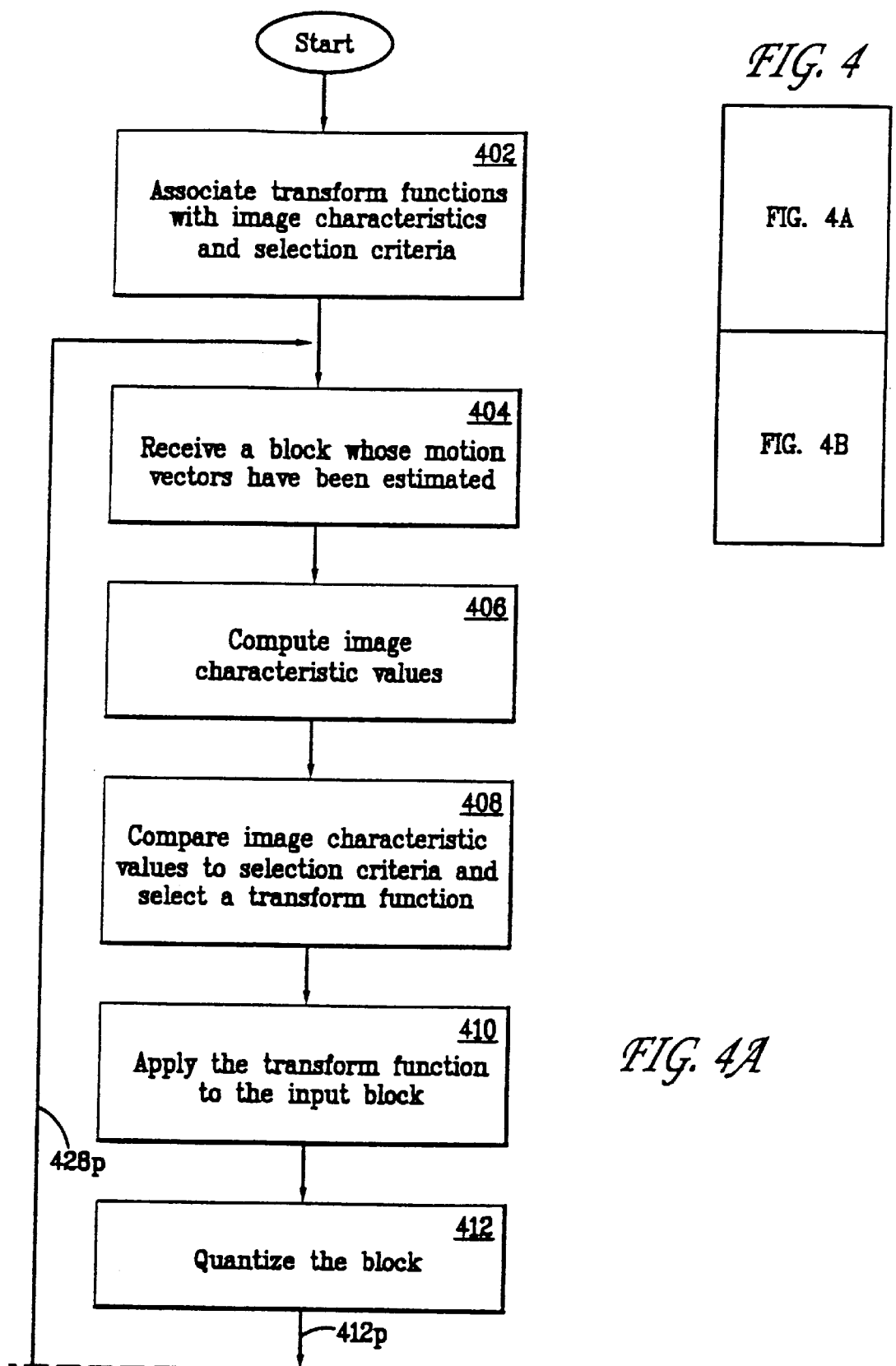
FIG. 4 shows the relationship between FIGS. 4A and 4B which together contain a flowchart of the processing performed by the video coding system in utilizing the present invention.
Figure 4B:
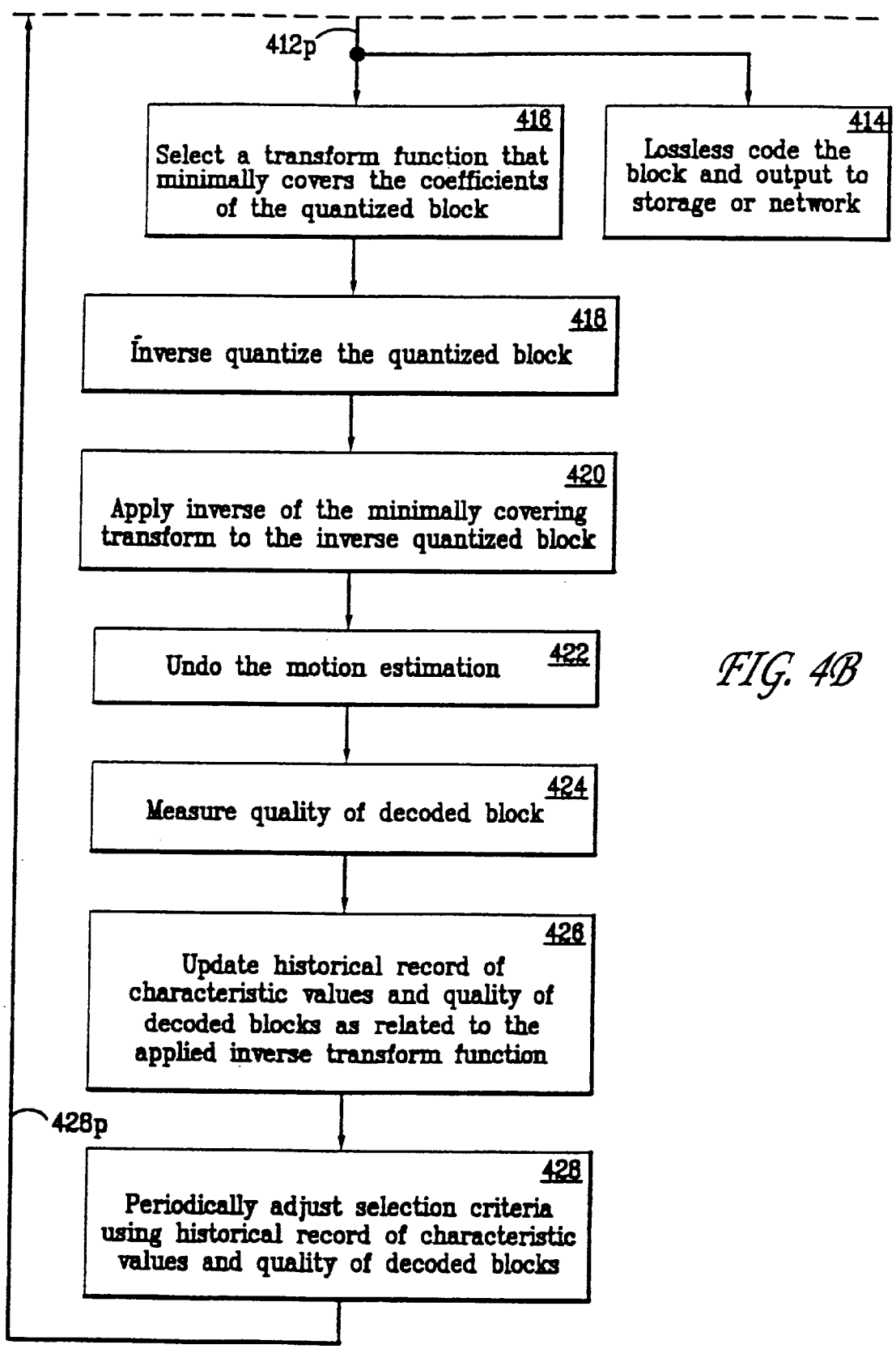

FIG. 4 shows the relationship between FIGS. 4A and 4B which together form a flowchart of the processing performed by the video coding system 300 in utilizing the present invention.

In step 402, the video coding system 300 performs initialization by associating predetermined transform functions with image characteristics and selection criteria. FIG. 5 illustrates how the associations are established in the exemplary system. Briefly, the types of image characteristics and selection criteria utilized include adjustable thresholds of overall energy, horizontal high pass energy, vertical high pass energy, and motion vector magnitudes. The adjustable thresholds and usage thereof are explained in more detail below.

Step 404 receives an input block whose motion vector has been estimated by the Motion Estimator 154; A motion vector consists of an x value and a y value, where x is the movement of the image in the block on an x-axis and y is the movement of the image in the block block on a y-axis. The input block is received by the transform processor 156 and the forward classifier 302, and the motion vector is received by the classifier feedback processor 304.

The pseudocode in Table 1 below corresponds to steps 406 and 408.

TABLE 1

```
001 ForwardClassification( Q, InputBlock, MotionVectors)
002 begin
003
004    // Compute characteristics of the input block.
005    energy = ComputeEnergy( InputBlock );
006    hHPenergy = ComputeHorizHighpassEnergy( InputBlock );
007    vHPenergy = ComputeVertHighpassEnergy( InputBlock );
008    mvMag = ComputeMotionVectorMagnitude( MotionVectors );
009
010    // Loop through each transform type.
011    for transformType = 1:NumberOfTransformTypeTypes-1
012
013        // Select proper thresholds.
014        threshEnergy = EnergyThresholdArray [transformType] [Q];
015        threshHHP = HorizHighPassEnergyThresholdArray[trans-
               formType] [Q];
016        threshVHP = VertHighPassEnergyThresholdArray[trans-
               formType] [Q];
```

TABLE 1-continued

```
017        threshMV = MotionVectorMagnitudeThresholdArray[trans-
               formType] [Q];
018
019        if energy < threshEnergy and
020            hEPenergy < threshHHP and
021            vHPenergy < threshVHP and
022            mvMag < threshMV
023        then
024            return transformType;
025        end
026    end
027
028    // Since none of the previous transform types work,
029    // select the most general transform type.
030    return DefaultTransformType;
031
032 end
```

At step 406, characteristic values are computed for the input block. Lines 5–8 of the pseudocode compute the respective values according to formulae set forth below:

The total energy is the image energy and is computed as the sum of the absolute pixel values. Specifically, where i and j form an index into the input block, x:

$$\text{total energy} = \Sigma_{(i,j) \in block} |x(i, j)|$$

The horizontal high pass energy is computed as the sum of absolute differences of horizontally adjacent pixel values. Specifically:

$$hHPenergy = \Sigma_{0 \leq 1 < Blockwidth-1,\ 0 \leq j < Blockheight} |x(i, j) - x(i+1, j)|$$

The vertical high pass energy is computed as the sum of the absolute differences of vertically adjacent pixel values. Specifically:

$$vHPenergy = \Sigma_{0 \leq i < Blockwidth,\ 0 \leq j < BlockHeight-1} |x(i, j) - x(i, j+1)|$$

The motion vector magnitude may be computed as either the sum of the squares of each component, or as the maximum of the two vector components. In the exemplary embodiment either calculation is suitable. Specifically:

$$mvMag = x^2 + y^2 \text{ or}$$

$$mvMag = \max(x, y)$$

Lines 10–30 of the pseudocode of Table 1 correspond to step 408. Step 408 selects a transform function based on the selection criteria set specified in lines 19–25.

FIG. 5 shows the Total EnergyThresholdArray memory map 452. The memory maps for the HorizHighPass EnergyThresholdArray, the VertHighPassEnergyThreshold Array, and the MotionVectorMagnitudeThresholds are similar in character to the TotalEnergyThresholdArray of FIG. 5. Therefore, for brevity only the EnergyThresholdArray is illustrated.

Each of the arrays has t rows, each representing a different transform function, and columns 1-MAX_Q which represent the constants used by the quantization processor 160. MAX_Q is a predetermined constant. Each entry in the respective arrays is initially zero, and, during the course of processing is updated by the classifier feedback processor 304.

The transform functions utilized in the exemplary system include Zero-block, One-by-Three, One-by-Eight, Two-by-Eight, Four-by-Four, Four-by-Eight, and Eight-by-Eight.

FIG. 6 shows the memory map of a block which is output after the application of the Four-by-Four block transform function. The transform processor 156 computes the coefficients for the upper-left four rows and four columns of the block. The computed coefficients are designated as $C_{ij}$ in the array. The remaining entries in the array are set to zero.

The Zero-block transform function results in the transform processor 156 setting every entry in the output block to zero. The One-by-Three transform function results in the transform processor 156 computing the coefficients for the first three columns of row one of the input block, and setting the remaining entries to zero. The One-by-Eight transform function results in the transform processor 156 computing the coefficients for all eight columns of row one of the input block, and setting the remaining coefficients to zero. The Two-by-Eight transform function results in the transform processor 156 computing the coefficients for all eight columns of rows one and two, and setting the remaining coefficients to zero. The Four-by-Eight transform function results in the transform processor 156 computing the coefficients for all eight columns of the first four rows of the input block, and setting the remaining entries to zero. The Eight-by-Eight transform function results in the transform processor 156 computing the coefficients for all eight rows and eight columns of the input block. Note that the Eight-by-Eight transform function is the DefaultTransformType as returned by the ForwardClassification pseudocode of Table 1.

Returning now to FIG. 4A, the transform processor 156 performs step 410 in applying to the input block the transform function selected by the forward classifier 302. The quantization processor 160 performs step 412 in quantizing the block received from the transform processor 156. Control is directed via path 412p to steps 414 and 416 of FIG. 4B. At step 414, the lossless coder 162 codes the block and outputs the block to data storage 108 or network input/output 122.

Step 416 is performed by the inverse classifier 308. The pseudocode in Table 2 below sets forth the processing for selecting a transform function that minimally covers the coefficients of the input quantized block.

TABLE 2

001 InverseClassification( QuantizedCoefficientBlock )
002 begin
003
004     // Determine the locations of the non-zero coefficients.
005     locOfNonZeroCoef
006         = DetermineLocationOfForNonZeroCoefs(QuantizedCo-
            efficientBlock );
007
008     // Find the transform whose set of coefficients minimally cover the
        non-zero
009     // coefficints
010     transformType = FindMinimalCoveringTransform( locOfNon-
        ZeroCoef );
011
012     return transformType;
013
014 end At lines 5–6 of the InverseClassification pseudocode, the locations of the non-zero entries in the quantized block are identified. Line 10 identifies the inverse transform function (e.g., Zero-block, One-by-Three, One-by-Eight, Two-by-Eight, Four-by-Four, Four-by-Eight, or Eight-by-Eight) whose application results in computing all coefficients for the input quantized block and which defines the smallest portion of the 8×8 block.

The inverse quantization processor 164 inversely quantizes the quantized block at step 418. Processing continues at step 420 where the inverse transform processor 166 applies the inverse of the transform function selected by the inverse classifier 308. The decoding process continues at step 422 where the motion compensator 168 undoes the motion estimation applied by the motion estimator 154.

The quality measurement processor 306 measures the quality of the decoded block at step 424. The exemplary system uses the following calculation to measure decoded block quality (Note that x is the original input block and x' is the decoded block while each element of blocks x and x' are represented by x(ij) and x'(ij), respectively):

$$PSNR = 10 log \Sigma_{(i,j) \in block}(x'(i,j))^2$$

*blocksize* $255^2$

The quality measurement processor 306 keeps a historical record of decoded block quality values and outputs the decoded clock quality on line 320 to the classifier feedback processor 304.

Figure 7:
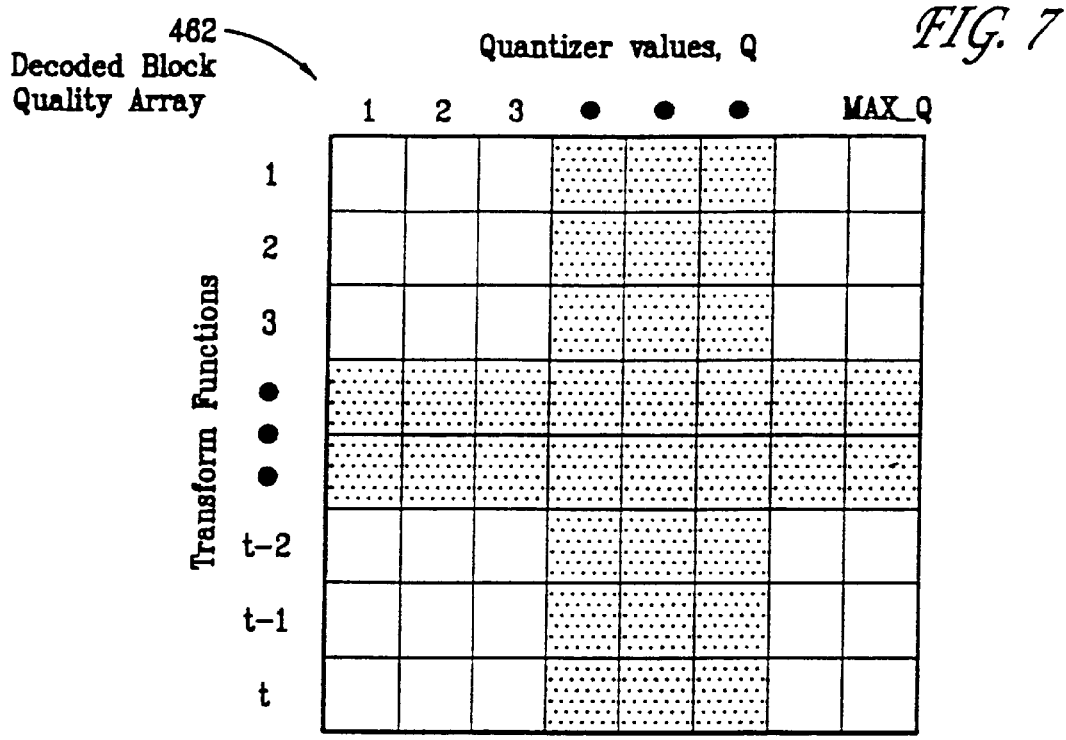
FIG. 7 illustrates the memory map of the Decoded Block Quality Array.

FIG. 7 illustrates the memory map of the Decoded Block Quality Array 462 in which historical records of decoded clock quality values are kept. For each transform function/quantizer value pair, a historical record is kept of the decoded block quality values. The decoded block quality value may be the average of the PSNR values, the median of the PSNR values, the minimum of the PSNR values, or another suitable statistical measure of the PSNR values. The particular statistical function chosen is driven by application requirements.

Returning to FIG. 4B, steps 426 and 428 are performed by the classifier feedback processor 304. The classifier feedback processor 304 maintains a historical record of characteristic values and quality measures of decoded blocks, as related to the applied inverse transform function applied by the inverse transform processor 166. At step 426 the historical record is updated. The pseudocode in Table 3 below sets forth the processing for updating the historical record.

TABLE 3

001 procedure UpdateHistograms
002 (
003     InputBlkCharHist [NumberOfInputBlkCharTypes] [NumberOf-
        TransformTypes] [MAX_Q],
004     InputBlkCharType.
005     InverseTransformType,
006     Q,
007     ForwardTransformType,
008     InputBlkCharValue,    // Comes from the forward classifier.
009 )
010
011 begin
012
012     // The array 'NumberOfComputedCoefficients' is a constant
        global array.
014     NumCoefInverse = NumberofComputedCoefficients[Inverse-
        TransformType];
015     NumCoefForward = NumberOfComputedCoefficients[Forward-
        TransformType];
016
017     if NumCoefInverse > SomeNiceConstant * NumCoefForward
018
019         // Select the histogram to update.
020         theHistogram = InputBlkCharHist[InputBlkCharType]
            [InverseTransformType] [Q]
021
022         // Update the histogram.
023         theHistogram [InputBlkCharValue]++;
024
025     end
026
027 end Inputs to the procedure, UpdateHistograms, include: (1) a histogram designated as InputBLkCharHist [NumberofInput CharTypes][NumberOfTransformTypes][MAX_Q]; (2) a characteristic designated as InputBlkCharType; (3) the inverse transform function designated as InverseTransformType; (4) the quantization value Q; (5) the forward transform function designated as ForwardTranformType; and (6) an input characteristic value designated as InputBlkCharValue.

Figure 8:
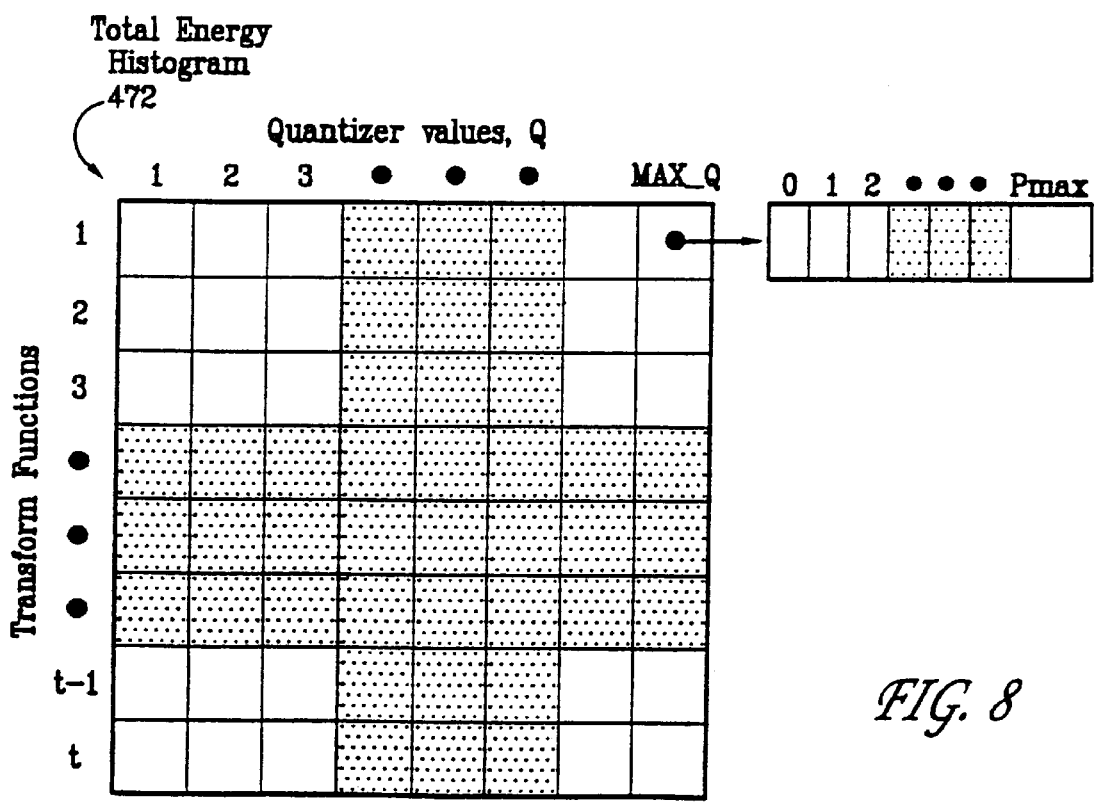
FIG. 8 illustrates the memory map of the Total Energy histogram.

FIG. 8 illustrates the memory map of the Total Energy Histogram 472. The memory maps of the Horizontal High Pass Energy Histogram, the Vertical High Pass Energy Histogram, the Motion Vector Magnitude Histogram are similar in character to the Total Energy Histogram. Therefore, for brevity only the Total Energy Histogram is illustrated. Each of the histograms is singly input to the UpdateHistograms procedure of Table 3 as shown by line 3 of the pseudocode.

Each of the histograms has a row for each of the available transform functions, and a column for each value in the range of quantization values. Each entry in the array references a one-dimensional array having indices ranging from 0 to a predetermined maximum value. Values in the one-dimensional array are updated as defined by the UpdateHistograms pseudocode of Table 3. The InputBlkCharType which is input to the UpdateHistograms pseudocode specifies which histogram to update.

Returning now to FIG. 4B, at step 428 the classifier Feedback processor 304 periodically adjusts the selection criteria used by the forward classifier 302 and then returns control, via control path 428p, to step 402 to process the next block. In the exemplary embodiment, the selection criteria are adjusted once per second.

The procedure UpdateThresholds, as set forth in the pseudocode of Table 4 below, updates the selection criteria by selectively updating the various thresholds in the TotalEnergyThresholdArray (FIG. 5), the HorizHighPassEnergy Array, the VertHighPassEnergyArray, and the MotionVectorMagnitudeArray.

TABLE 4

```
001 procedure UpdateThresholds
002 (
003
004     InputBlkCharTresh[NumberOfInputBlkCharTypes] [Number-
        OfTransformTypes] [MAX_Q],
005     InputBlkcharHist[NumberOfInputBlkCharTypes] [Number-
        OfTransformTypes] [MAX_Q],
006     DecodedBlockQuality[[NumberOfTransformTypes] [MAX_Q],
007 )
008
009 begin
010
011     // Loop through each transform type.
012     for TransformType = 1:NumberOfTransformTypes
013
014         // Loop through each quantizer value.
015         for Q = 1:MaxQ
016
017             // Loop through each input block characteristic type
018             for InputBlkCharType = 1:NumberOfInputBlkCharTypes
019
020                 // Select the Order-Statistic type.
021                 OrderStatisticType =
022                     SelectOrderStatistic
023                     (
024                         InverseTransformType,
025                         Q,
026                         InputBlkCharType,
027                         DecodedBloockQuality [Transform-
                            Type] [Q]
028                     );
029
030                 // Compute the updated threshold.
```

TABLE 4-continued

```
031                 InputBlkCharThreshfInputBlkCharType]
                    [ TransformType] [Q] =
032                     OrderStatistic
033                     (
034                         orderStatisticType,
035                         InputBlkCharHist[InputBlkCharType]
                            [TransformType] [Q]
036                     );
037
038             end
039         end
040     end
041
042 end
```

The inputs to the procedure are listed in lines 4–6. The input parameter at line 4 references the threshold arrays (See FIG. 5); the input at line 5 references the corresponding histograms (See FIG. 8); and the input at line 6 references the Decoded Block Quality Array (See FIG. 7).

As set forth in lines 12–40, each of the threshold arrays is updated by first selecting an order statistic to apply to the respective histogram, and then applying the selected order statistic to the respective histogram. The OrderStatistic function which is initiated on lines 31–36 applies the orderStatisticType to the referenced histogram of characteristic values. The orderStatisticType is a percentage, and the OrderStatistic function computes the characteristic value. To compute the characteristic value, the number of occurrences for all the characteristic values are totaled, and the total is multiplied by the orderStatisticType to obtain an adjusted occurrence total. Then, beginning at the lowest characteristic value in the histogram and proceeding with the following characteristic values, the number of occurrences are totaled until the adjusted occurrence total is reached. The OrderStatistic function then returns the characteristic value at which the adjusted occurrence total was reached.

The pseudocode for the function SelectOrderStatistic is set forth in Table 5 below.

TABLE 5

```
001 function SelectOrderStatistic
002 (
003     TransformType,
004     Q,
005     InputBlkCharType,
006     DecodedBlockQuality
007 )
008
009 begin
010
011     // The array 'NumberOfComputedCoefficients' is a constant
        global array.
012     NumCoef = NumberOfComputedCoefficients[TransformType];
013
014     // Depending on the measure being used, select the Order-
        StatisticType.
015     // Constants k1–k4 are predetermined.
016     case InputBlkCharType of
017         begin
018             Energy:         OrderStatisticType = k1*Num-
                                Coef*DecodedBlockQuality;
019             HorizHpEnergy:  OrderStatisticType = k2*Num-
                                Coef*DecodedBlockQuality;
020             VertHPEnergy:   OrderStatisticType = k3*Num-
                                Coef*DecodedBlockQuality;
```

TABLE 5-continued

```
021         MVMagnitude:    OrderStatisticType = k4*Num-
                            Coef*DecodedBlockQuality;
022     end
023
024     return OrderStatisticType;
025
026 end
```

The inputs to the SelectOrderStatistic function are set forth in lines 3–6. The inputs are the transform type, the quantization value, a characteristic type, and a value that indicates the quality of the decoded block.

The function SelectOrderStatistic returns an OrderStatisticType based upon the input characteristic type, a predetermined constant, the number of coefficients computed for the input transform type, and the input quality value.

While the foregoing exemplary embodiment of the invention is described in terms of a software implementation, those skilled in the art will recognize that the invention could also be implemented using logic circuits. The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A computer-implemented method for coding a block of pixels of a digitized video image using a selectable one of a plurality of coding functions, the method comprising:

establishing adjustable selection criteria for selecting a coding function;

measuring a predetermined characteristic of the block to obtain a characteristic value;

selecting a coding function based on said adjustable selection criteria and said characteristic value;

coding the block according to said coding function to obtain a coded block;

performing a quality measurement of said coded block;

adjusting said adjustable selection criteria for selecting a coding function, utilizing said quality measurement such that quality measurements of subsequent blocks are improved; and establishing historical records of quality values and characteristic values and associated coding functions and quantization values.

2. The method of claim 1, wherein said performing further comprises:

decoding said coded block to obtain a decoded block.

3. The method of claim 2, further comprising selecting a decoding function independent of selecting said coding function.

4. The method of claim 3, further comprising:

further establishing said historical records based on detected characteristics of blocks and selected decoding functions; and adjusting said adjustable selection criteria based on said historical records.

5. The method of claim 1, wherein said measuring measures a predetermined plurality of characteristics, and said selecting selects a coding function based on said adjustable selection criteria and said plurality of characteristics.

6. The method of claim 5, wherein said plurality of characteristics include a total energy characteristic defined as $\Sigma_{(i,j) \in block} |x(i,j)|$, wherein x represents the block of pixels, and i and j are indices into the block.

7. The method of claim 5, wherein said plurality of characteristics include a horizontal high pass energy characteristic defined as $$\Sigma_{0 \leq i < Blockwidth-1,\ 0 \leq j < BlockHeight} |x(i,j) - x(i+1,j)|$$

wherein x represents the block of pixels, and i and j form indices into the block.

8. The method of claim 5, wherein said plurality of characteristics include a vertical high pass energy characteristic defined as $$\Sigma_{0 \leq i < Blockwidth, 0 \leq j < BlockHeight-1} |x(i,j) - x(i,j+1)|$$

wherein x represents the block of pixels, and i and j form indices into the block.

9. The method of claim 5, wherein said plurality of characteristics include a motion vector magnitude characteristic, defined as $x^2+y^2$, wherein x represents the movement of the image in the block on an x-axis and y represents movement of the image in the block on a y-axis.

10. The method of claim 5, wherein said plurality of characteristics include a motion vector magnitude characteristic defined as the maximum of x and y, wherein x represents the movement of the image in the block on an x-axis and y represents movement of the image in the block on a y-axis.

11. The method of claim 1, wherein said performing a quality measurement includes the obtaining a peak-signal-to-noise ratio.

12. The method of claim 11, further comprising:

further establishing said historical records based on detected characteristics of blocks and selected decoding functions; and adjusting said adjustable selection criteria based on said historical records.

13. A computer-implemented method for transforming a block of pixels within a frame of a digitized video image using a selectable one of a set of transform functions, each transform function having an inverse transform function, and each block having a predetermined set of image characteristics, the method comprising:

establishing adjustable selection criteria for selecting a transform function;

detecting respective characteristic values for the image characteristics of a block;

selecting a first transform function from said set of transform functions based on said characteristic values and said adjustable selection criteria;

applying said first transform function to said block to form a transformed block;

quantizing said transformed block to form a quantized block;

selecting an inverse transform function whose application minimally covers said quantized block;

inversely quantizing said quantized block to form an inversely quantized block;

applying said inverse transform function to said inversely quantized block to form a decoded block;

establishing a quality value for said decoded block for improving subsequent coded images;

updating said adjustable selection criteria based on said quality value and said characteristic values; and establishing historical records of quality values and characteristic values and associated transform functions and quantization values.

14. A computer-implemented method for transforming a block of pixels within a frame of a digitized video image using a selectable one of a set of transform functions, each transform function having an inverse transform function, and each block having a predetermined set of image characteristics, the method comprising:

associating the transform functions with the set of image characteristics, with predetermined quantization values, and with adjustable thresholds associated with the image characteristics;

obtaining respective characteristic values for the image characteristics of a block;

selecting a transform function from the set of transform functions based on comparisons between said characteristic values and said adjustable thresholds;

applying said transform function to the block to form a transformed block;

quantizing said transformed block using a quantization value to form a quantized block;

selecting an inverse transform function whose application minimally covers said quantized block;

inversely quantizing said quantized block to form an inversely quantized block;

applying said inverse transform function to said inversely quantized block to form a decoded block;

obtaining a quality value for said decoded block for improving images;

updating said adjustable thresholds based on said quality value and said characteristic values; and establishing historical records of quality values and characteristic values and associated transform functions and quantization values.

15. The method of claim 14, further comprising:

establishing histograms of characteristic values for each of the image characteristics and associated transform functions and quantization values;

recording said characteristic values in histograms referenced by said transform function and said quantization value;

selecting a statistical function to apply to said histograms;

applying said statistical function to said histograms;

updating said adjustable thresholds with data from application of said statistical function to said histograms; and wherein said step of obtaining a quality value further comprises obtaining a peak signal-to-noise ratio for said decoded block.

16. The method of claim 14, further comprising:

recording said quality value and characteristic values in historical records referenced by said transform function and said quantization value;

selecting a statistical function to apply to said historical records;

applying said statistical function to said historical records; and updating said adjustable thresholds with data from application of said statistical function to said historical records.

17. The method of claim 14, wherein said obtaining characteristic values comprises:

obtaining a total energy value;

obtaining a horizontal high pass energy value;

obtaining a vertical high pass energy value; and obtaining a motion vector magnitude value.

18. The method of claim 17, wherein said selecting a transform function comprises:

comparing said total energy value to an adjustable total energy threshold;

comparing said horizontal high pass energy value to an adjustable horizontal high pass energy threshold;

comparing said vertical high pass energy value to an adjustable vertical high pass energy threshold;

comparing said motion vector magnitude value to an adjustable motion vector magnitudes threshold; and if, for a given transform function, said total energy value is less than said adjustable total energy threshold, and said horizontal high pass energy value is less than said adjustable horizontal high pass energy threshold, and said vertical high pass energy value is less than said adjustable vertical high pass energy threshold, and said motion vector magnitude value is less than said adjustable motion vector magnitude threshold, then selecting said given transform function.

19. The method of claim 15, wherein said establishing histograms further comprises the steps of:

establishing a total energy histogram;

establishing a horizontal high pass energy histogram;

establishing a vertical high pass energy histogram; and establishing a motion vector magnitude histogram.

20. The method of claim 19, wherein said selecting a transform function comprises:

comparing said total energy value to an adjustable total energy threshold;

comparing said horizontal high pass energy value to an adjustable horizontal high pass energy threshold;

comparing said vertical high pass energy value to an adjustable vertical high pass energy threshold;

comparing said motion vector magnitude value to an adjustable motion vector magnitudes threshold; and if, for a given transform function, said total energy value is less than said adjustable total energy threshold, and said horizontal high pass energy value is less than said adjustable horizontal high pass energy threshold, and said vertical high pass energy value is less than said adjustable vertical high pass energy threshold, and said motion vector magnitude value is less than said motion vector magnitude threshold, then selecting said given transform function.

21. A processor for coding a block of pixels of a digitized video image using a selectable one of a plurality of coding functions, comprising:

establishment means for establishing adjustable selection criteria used to select a coding function;

measurement means for measuring a predetermined characteristic of the block to obtain a characteristic value;

selection means for selecting a coding function based on said adjustable selection criteria and said characteristic value;

code means for coding the block according to said coding function selected to obtain a coded block;

performance means for performing a quality measurement of said coded block;

adjustment means for adjusting said adjustable selection criteria for selecting a coding function, utilizing said quality measurement such that quality measurements of subsequent blocks are improved; and establishment means for establishing historical records of quality values and characteristic values and associated coding functions and quantization values.

22. A computer-readable medium comprising program instructions for causing a processing system to perform a method to code a block of pixels of a digitized video image using a selectable, one of a plurality of coding functions, the method comprising:

establishing adjustable selection criteria for selecting a coding function;

measuring a predetermined characteristic of the block to obtain a characteristic value;

selecting a coding function based on said adjustable selection criteria and said characteristic value;

coding the block according to said coding function selected to obtain a coded block;

performing a quality measurement of said coded block;

adjusting said adjustable selection criteria for selecting a coding function, utilizing said quality measurement such that quality measurements of subsequent blocks are improved; and establishing historical records of quality values and characteristic values and associated coding functions and quantization values.

* * * * *